United States Patent [19]

Justice

[11] Patent Number: 4,950,103
[45] Date of Patent: Aug. 21, 1990

[54] CORRUGATED DRAINAGE TUBE

[76] Inventor: Donald R. Justice, P.O. Box 458, Matlacha, Fla. 33909

[21] Appl. No.: 380,482

[22] Filed: Jul. 17, 1989

[51] Int. Cl.⁵ .......................................... F16L 31/00
[52] U.S. Cl. .................................... 405/43; 138/177; 405/36; 405/45; 405/49
[58] Field of Search ...................... 405/43, 45, 46–49; 52/169.5, 169.14; 138/105, 104, 173, 177, 121, 103

[56] References Cited

U.S. PATENT DOCUMENTS

| | | |
|---|---|---|
| 955,847 | 4/1910 | Carmean . |
| 1,055,674 | 3/1913 | Smith . |
| 2,365,888 | 12/1944 | Linderfelt et al. . |
| 2,787,442 | 4/1957 | Lewis . |
| 3,327,865 | 6/1967 | Thompson . |
| 3,330,303 | 7/1967 | Fochler . |
| 3,374,634 | 3/1968 | Fochler . |
| 3,440,822 | 4/1969 | Hegler . |
| 3,455,584 | 7/1969 | Henrickson . |
| 3,699,684 | 10/1972 | Sixt . |
| 3,830,373 | 8/1974 | Sixt et al. . |
| 3,958,425 | 5/1976 | Maroschak . |
| 4,175,882 | 11/1979 | Gilead ................................... 405/43 |
| 4,182,580 | 1/1980 | Hieda et al. ........................... 405/43 |
| 4,288,321 | 9/1981 | Beane . |
| 4,360,042 | 11/1982 | Fouss et al. . |
| 4,523,613 | 6/1985 | Fouss et al. . |
| 4,624,603 | 11/1986 | Kanao ............................... 405/43 X |

FOREIGN PATENT DOCUMENTS

| | | | |
|---|---|---|---|
| 0029713 | 6/1981 | European Pat. Off. .............. | 405/45 |
| 2262994 | 7/1974 | Fed. Rep. of Germany ........ | 405/43 |
| 1388511 | 4/1988 | U.S.S.R. ................................ | 405/49 |
| 2016639 | 9/1979 | United Kingdom .................. | 405/43 |

Primary Examiner—Dennis L. Taylor
Attorney, Agent, or Firm—Fleit, Jacobson, Cohn, Price, Holman & Stern

[57] ABSTRACT

A drainage tube includes alternating annular peaks and annular valleys on an exterior wall of the tube. An interior wall of the tube is smooth and continuous along its length. The combined exterior wall and interior wall form an elongated tube. In alternating, selected valleys of the exterior wall of the tube are arranged a plurality of slots extending transverse to a longitudinal axis of the tube so that water can drain into the tube through the slots. These plurality of openings extend through the smooth interior wall of the tube to the interior space of the tube. In addition, each of the annular peaks on the exterior wall of the tube includes a recessed groove. At the base of each of these grooves are located a plurality of circular openings having a smaller diameter on the exterior of the tube, increasing in diameter towards the interior of the tube. Corresponding openings are located on the smooth interior wall of the tube so that water can drain into the tube through these additional openings located spaced from the openings in the grooves of the annular peaks of the exterior wall.

6 Claims, 2 Drawing Sheets

CORRUGATED DRAINAGE TUBE

FIELD OF THE INVENTION

This invention is an improved corrugated drainage tube for removal of water.

BACKGROUND OF THE INVENTION

U.S. Pat. Nos. 3,699,684 and 3,830,373 to Sixt and Sixt et al., respectively, disclose corrugated drainage tubes for removal of groundwater as shown in FIG. 1. These tubes are of a corrugated configuration having alternating annular peaks and valleys along the exterior and interior of the single wall of the tube. A plurality of slotted openings are arranged transversely to the longitudinal axis of the tube so that water can drain into the tube through these openings. A water permeable restraining screen surrounds the tube and engages peaks of the alternating annular peaks and annular valleys for restraining waterborne particles above a predetermined size from entering the tube when water drains into the tube through the screen and openings. The water permeable screen allows waterborne silt and clay to pass therethrough which prevents the screen from becoming clogged with these particles.

SUMMARY OF THE INVENTION

By the present invention, a drainage tube includes alternating annular peaks and annular valleys on an exterior wall of the tube. An interior wall of the tube is smooth and continuous along its length. The combined exterior wall and interior wall form an elongated tube. In alternating, selected valleys of the exterior wall of the tube are arranged a plurality of slots extending transverse to a longitudinal axis of the tube so that water can drain into the tube through the slots. These plurality of slots extend through the smooth interior wall of the tube to the interior space of the tube. In addition, each of the annular peaks on the exterior wall of the tube includes a recessed groove. At the base of each of these grooves are located a plurality of circular openings having a smaller diameter on the exterior of the tube, increasing in diameter towards the interior of the tube. Corresponding openings are located on the smooth interior wall of the tube so that water can drain into the tube through these additional openings located spaced from the openings in the grooves of the annular peaks of the exterior wall.

The drainage tube of the invention provides improved drainage of water to the interior of the tube from the exterior of the tube and improved movement of water through the tube by the smooth interior wall of the tube. The increasing diameter openings located in the base of the grooves of the annular peaks of the exterior wall of the tube, prevent particles from wedging into these openings of the tube. Due to the increasing diameter of these openings, and the water pressure surrounding the tube, particles, approximately the same size as the diameter of the openings on the exterior wall of the tube, will be forced through the openings and into the tube through the interior wall to be drained by the water flowing through the tube.

It is an object of the present invention to provide a drainage tube having an exterior wall including a plurality of alternating annular peaks and annular valleys and a smooth interior wall bridging the annular peaks of the exterior wall.

It is another object of the present invention to provide a drainage tube having an exterior wall including a plurality of alternating annular peaks and annular valleys and a smooth interior wall bridging the annular peaks of the exterior wall, with the annular peaks including a recessed groove having a plurality of openings located at the base of the grooves.

It is yet another object of the present invention to provide a drainage tube having an exterior wall including a plurality of alternating annular peaks and annular valleys and a smooth interior wall bridging the annular peaks of the exterior wall, with the annular peaks including a recessed groove having a plurality of openings located at the base of the grooves, with these openings having an increasing diameter from the exterior of the tube towards the interior of the tube.

It is still yet another object of the present invention to provide a drainage tube having an exterior wall including a plurality of alternating annular peaks and annular valleys and a smooth interior wall bridging the annular peaks of the exterior wall, with the annular peaks including a recessed groove having a plurality of openings located at the base of the grooves, with these openings having an increasing diameter from the exterior of the tube towards the interior of the tube, with the tube being sufficiently flexible for use as a drainage tube.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
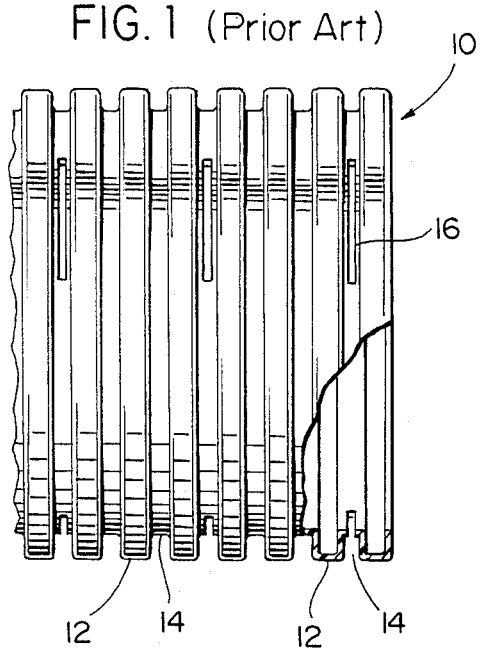
FIG. 1 is a partial, sectional view of a prior art drainage tube.
Figure 2:
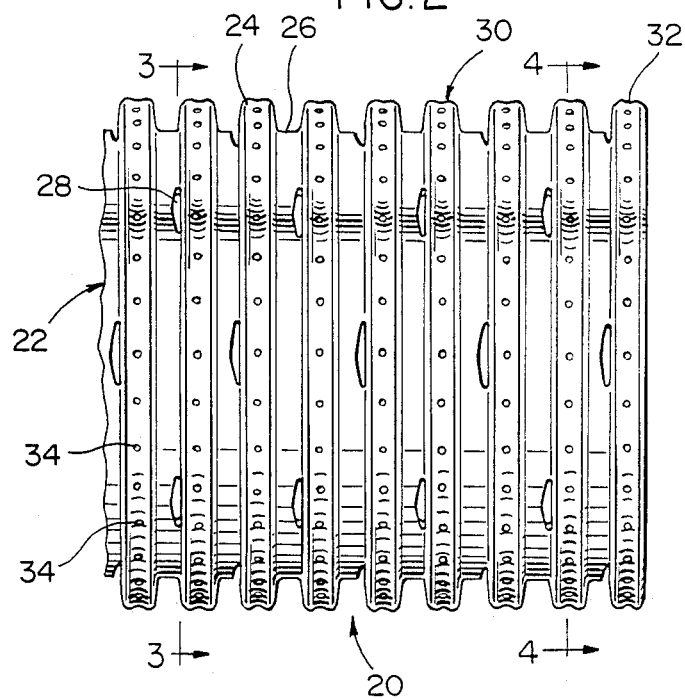
FIG. 2 is a side view of a section of drainage tube of the present invention.

In FIG. 1, a prior art drainage tube 10 is shown which is representative of the drainage tube disclosed in U.S. Pat. Nos. 3,699,684 and 3,830,373 to Sixt and Sixt et al., respectively. The corrugated tube 10 includes a body portion having a series of alternating annular peaks 12 and annular valleys 14. The annular valleys 14 are provided with drainage slots or openings 16 so that liquid can pass into the tube and drain away into, for example, a main, irrigation ditch, or waterway. The slots or openings 16 are provided in every third annular valley of the corrugated drainage tube 10. Each valley has three equally-spaced apart openings and the combined open area provided by the slots in the tube is preferably between about ½ and 1% of the longitudinal surface area of the tube.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 2 through 6, in particular, a drainage tube embodying the teachings of the subject invention is generally designated as 20. With reference to its orientation in FIG. 2, the drainage tube comprises an exterior wall 22, forming a series of alternating annular peaks 24 and valleys 26. Each of the annular valleys 26 include four triangular-shaped slots 28 spaced about the periphery of each valley. Each of the annular peaks 24 includes a upper wall 30 which is recessed by a groove 32. At the bottom of each groove 32 is located a plurality of holes 34 spaced about the periphery of each upper wall of the annular peaks.

Figure 6:
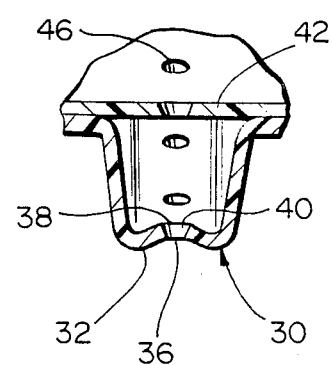
FIG. 6 is an enlarged sectional view of a portion of an interior and exterior wall of the drainage tube.

As shown in FIG. 6, each of the openings 34 includes an opening 36 at the exterior of upper wall 30, having a predetermined diameter. On the interior surface of upper wall 30 is an opening 38 having diameter greater than that of opening 36, with the walls 40, between the openings 36 and 38, tapering outwardly from the opening 36 towards the opening 38. The increasing diameter of the opening 34, as it extends through the upper wall 30, prevents any particles from wedging in the opening 34 and blocking the opening 34 as water flows from outside the tube towards the inside of the tube.

Figure 5:
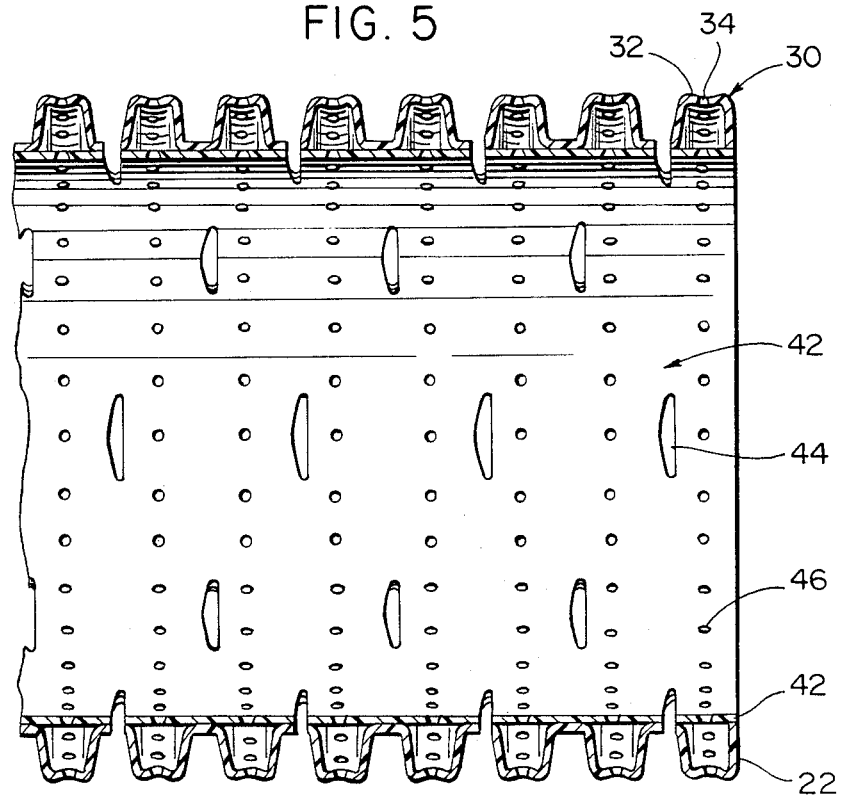
FIG. 5 is a sectional view taken along line 5—5 of FIG. 3.
Figure 3:
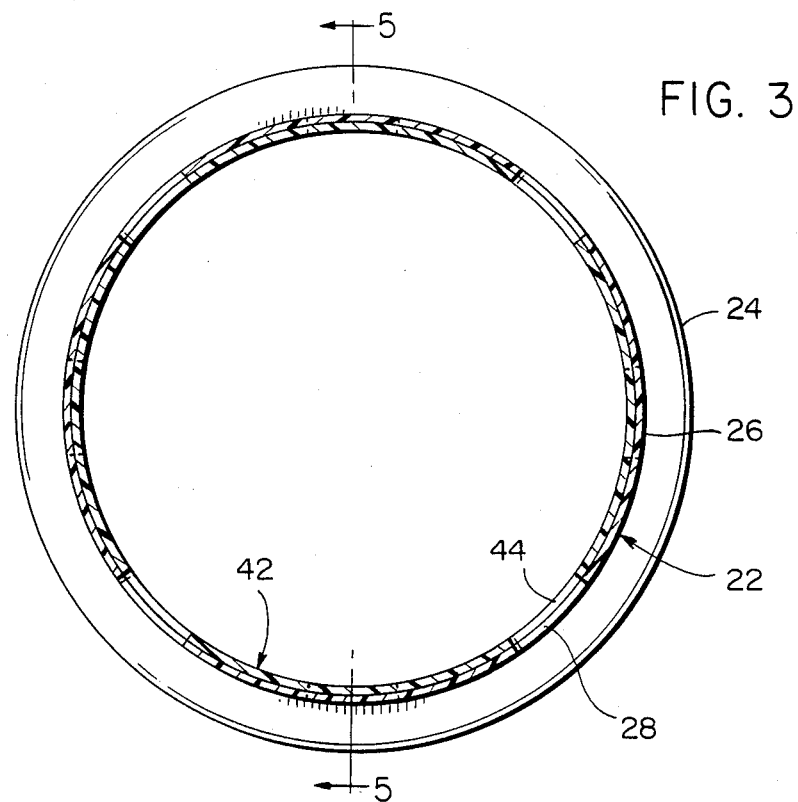
FIG. 3 is a sectional view taken along line 3—3 of FIG. 2.
Figure 4:
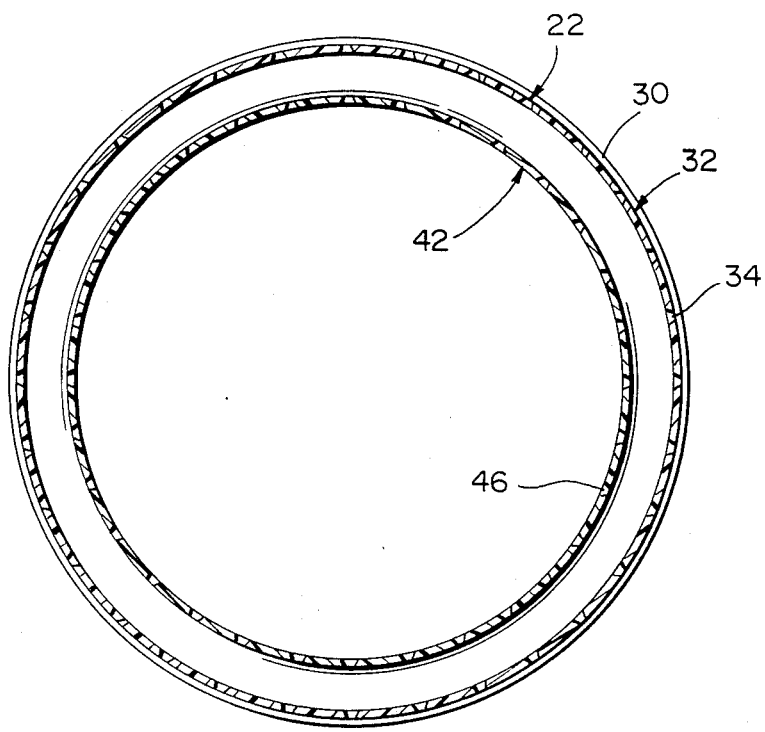
FIG. 4 is a sectional view taken along line 4—4 of FIG. 2.

In FIG. 5, interior wall 42 is shown as being smooth and continuous along the interior of the tube 20. Interior wall 42 is joined to exterior wall 22 at the interior of the surface of the annular valleys 26.

At corresponding locations of slots 28 and openings 34, in the exterior wall 22, are slots 44 and openings 46 of the interior wall, which are aligned with the corresponding slots and openings of the exterior wall. Therefore, water entering the tube through the exterior slots and openings travels to the interior of the tube through the corresponding slots and openings of the interior wall. The openings 46 are similar in construction to the openings 34, having outwardly tapering side walls as the diameter of the opening 46 increases towards the interior of the tube 20.

The smooth surface of the interior wall 42 provides for increased flow of water through the tube since the alternating peaks and valleys of the prior art tube have been eliminated. The interior wall 42 is made of a thin film polyethylene material which maintains the flexibility of the tube 20 by avoiding constraints on the flexibility of the exterior wall 22 of the tube 20.

It is possible due to the numerous amount of slots and openings through the tube to avoid the use of a drainage screen or sock around the tube when the tube is buried underground. Alternately, a drainage sock may be used with the tube of the invention with the surface of the drainage sock resting against the upper wall 30 of each annular peak with the upper wall forming two points of contact on opposite sides of each groove 32, having openings 36.

In use, the drainage tube of the invention is buried below ground for draining of water towards a location where it is pumped from the drainage tube. The plurality of openings 34 allow entry of water without blockage of the openings due to the tapering side walls of the opening, and passage of the water through the openings 34 to correspondingly-spaced openings 46, located in an interior wall of the tube. Similarly, water passes through slots 28, formed in the exterior wall 22, and passes through correspondingly located slots 44, formed in the interior wall 42 of the drainage tube 20.

Having described the invention, many modifications thereto will become apparent to those skilled in the art to which it pertains without deviation from the spirit of the invention as defined by the scope of the appended claims.

I claim:

1. A drainage tube comprising;
    a corrugated exterior wall having a plurality of alternating annular peaks and annular valleys,
    a smooth surfaced interior wall joined to said exterior wall for passage of water therethrough by slots defined by said interior wall and said exterior wall, and
    said exterior wall being joined to said interior wall at an interior surface of said annular valleys,
    an outermost surface of said annular peaks including a groove separating said annular peaks into spaced raised portions located on opposite sides of a base of said groove for supporting a sock drain across said raised portions and thereby spacing the sock drain from aid base of said groove,
    said groove including a plurality of spaced openings located in said base of said groove,
    said interior wall including a plurality of openings for passage of water therethrough from said openings of said groove.

2. A drainage tube according to claim 1, wherein said openings of said groove taper outwardly toward an interior of the tuber.

3. A drainage tube for removable of water, aid drainage tube comprising:
    a corrugated exterior wall having a plurality of alternating annular peaks and annular valleys,
    a smooth surfaced interior wall joined to said exterior wall at an interior surface of said annular valleys,
    a plurality of slots extending through said annular valleys of said exterior wall and through said interior wall,
    a groove defined in an outermost surface of said annular peaks separating said annular peaks into spaced raised portions located on opposite sides of a base of said groove for supporting a sock drain across said raised portions and thereby spacing the sock drain from said base of said groove, and
    a plurality of spaced openings located in said groove and having corresponding openings located in said interior walls paced from said plurality of openings of said exterior wall for passage of water through said exterior wall and said interior wall so as to be conveyed along drainage tube.

4. A drainage tube according to claim 3, wherein said plurality of openings of said exterior wall taper outwardly as extending radially inwardly towards a center of the drainage tube.

5. A drainage tube according to claim 3, wherein said plurality of slots are located in each of said annular valleys.

6. A drainage tube according to claim 5, wherein said plurality of slots are triangularly shaped.

* * * * *